BOBBY J. SUBLETT
GEORGE P. TOUEY
INVENTOR.

United States Patent Office 3,381,070
Patented Apr. 30, 1968

3,381,070
METHOD OF PRODUCING A FILTER ELEMENT
Bobby J. Sublett and George P. Touey, Kingsport, Tenn., assignors to Eastman Kodak Company, Rochester, N.Y., a corporation of New Jersey
Filed Sept. 8, 1964, Ser. No. 394,982
1 Claim. (Cl. 264—122)

ABSTRACT OF THE DISCLOSURE

A method for producing tobacco smoke filter elements made from continuous crimped filaments having a solid particulate additive secured to their surface at random points by a heat sensitive, low melting, finely divided solid particulate bonding agent.

Figure 1:
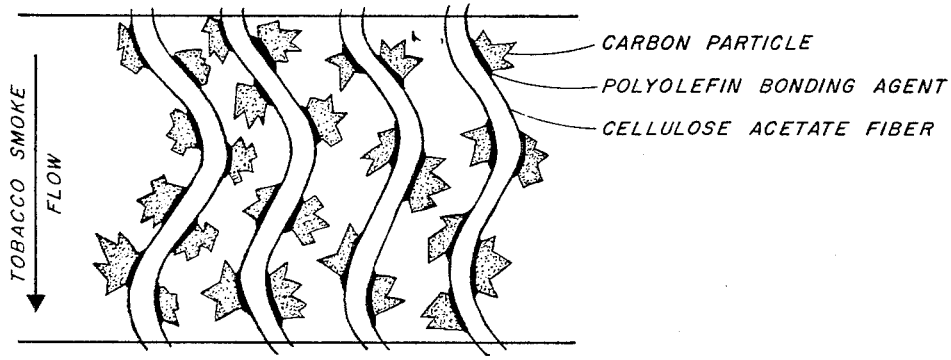

This invention concerns a method of making new and improved cigarette filters containing activated carbon. In further detail, a method of producing a cigarette filter which consists of activated carbon granules bonded to a crimped cellulose acetate tow type of filter rod by means of certain thermoplastic bonding agents to be described in detail hereinafter.

Many of the advantages of the use of activated carbon in filter rods have been disclosed by Touey in U.S. Patents 2,881,770, 3,043,736 and 2,801,638. It is shown that filters containing such activated carbon remove certain components from the vapor phase of tobacco smoke.

The use of a cellulose acetate tow type of filter for removing particulate matter, commonly called tar, from cigarette smoke is known to the art. There are several commercial filters which contain activated carbon and cellulose acetate. Frequently, they consist of two component filters commonly known as "dual filters." The outer segment of such filter combinations consists of cellulose acetate tow without any additive. However, the inner segment is (a) cellulose acetate tow fibers containing carbon particles on their surfaces or (b) paper impregnated with carbon particles. Also, a third type (c) has appeared recently. This filter has loose carbon granules between two cellulose acetate filters.

There are certain disadvantages involved in both the manufacture and utility of the aforementioned filters. In the manufacture of filters containing loose carbon on cellulose acetate tow, the carbon has a tendency to sift out. Thus, a considerable amount of carbon is lost causing the filter rod to become blackened by the sifting carbon, which gives the finished rod a dirty appearance. The loss of carbon also reduces the capacity of the filter for removing vapors from the smoke. In addition, the sifting out of loose carbon either during the processing of the filter or after it is made leaves much to be desired from the standpoint of clean working conditions.

In the case of carbon bonded to paper a very fine carbon is generally used and this presents a "housecleaning" problem. In addition, the use of fine carbon restricts the amount of carbon which can be used in order to avoid an excessive pressure drop (resistance to smoke or air flow). The use of usual glues, adhesives, and plasticizers to bond carbon to paper or fiber aids in preventing the loss of carbon; however, these materials are adsorbed by carbon which reduces the effectiveness of the carbon for removing smoke vapors. Also glues and other tacky substances make the processing of the filter difficult since the material has a tendency to adhere to the various parts of the rod making machine.

Filters containing loose carbon between two cellulose acetate filters must be manufactured on special equipment since they cannot be cut in the same manner as a conventional filter rod. The construction of these filters also presents the "housecleaning" problem which is involved in methods which use loose carbon. Also it is obvious that such a filter combination cannot be made at the rapid speeds demanded by the industry.

Hence, it is apparent that the development of new carbon combinations and methods of making carbon-containing rods represents a highly desirable result. After extended investigation, we have found a convenient and effective method by which activated carbon can be used with cellulose acetate tow as a cigarette filter. This method provides a means for bonding carbon to cellulose acetate tow without deactivating the carbon, without creating a "housecleaning" problem or giving an undesirable appearance to the finished filter. Also, the filters can be manufactured on equipment presently used for the manufacture of filter rods from crimped cellulose acetate tows.

One object of this invention is to disclose an improved method of producing a filter consisting of activated carbon bonded to cellulose acetate tow. Another object is to provide a method of producing a filter that can be used in a dual or multiple filter combination for cigarettes. A particular object is to disclose an improved method of producing filters by incorporating carbon into a cellulose acetate filter in a form other than loose granules or powders. Other objects will appear hereinafter.

In the broader aspects of this invention these objects are accomplished by mechanically blending activated carbon particles with particles of a thermoplastic polymer. The blend is then added to an opened cellulose acetate tow for converting the combination into filter rods, and heating the rods to soften the thermoplastic particles. The thermoplastic particles which have been found to be useful are of the polyolefin type. They include polyolefins and polyoefin copolymers such as polyethylene, polypropylene, polybutylene and copolymers of ethylene, propylene and butylene. Carbons which have been found to be useful can be derived from wood, petroleum, nut shell (such as coconut or pecan shell), coal, blood, bone or other convenient sources. The carbon preferably is of a particle size which will not pass through a 100-mesh screen but which will pass through an 8-mesh screen. The desired carbon particle size is between 20 and 60 mesh. The polyolefin particles can be within 10 to 300 mesh; its preferred size is 50–200 mesh.

The carbon and the polyolefin are blended to give a mixture of 5 to 50 percent by weight of polyolefin. Preferably, the mixture should contain 10 to 25 percent by weight polyolefin. The operation to make a rod is as follows. The mixture of carbon and polyolefin is added to the bloomed or opened cellulose acetate tow at one point in the process of the filter rod manufacture. Then the tow is recompacted and wrapped with a paper tape to form the filter rods. The rods are placed in a suitable heating device and heated from 60–180° C. for 2–45 minutes depending upon the amount and composition of the polyolefin. For example, very satisfactory results were obtained when a rod which contained 20 percent by weight of a copolymer of propylene and butylene (40 percent butylene) was heated for 8 minutes at 85° C. After this heat treatment which bonds the carbon to the cellulose acetate fibers, the rods are cooled to room temperature and cut to the desired lengths for use as cigarette filters.

Figure 2:
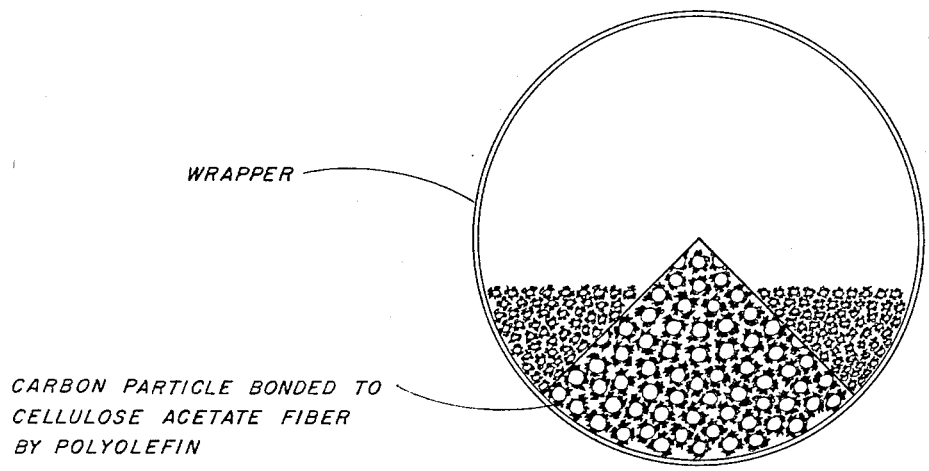
Figure 3:
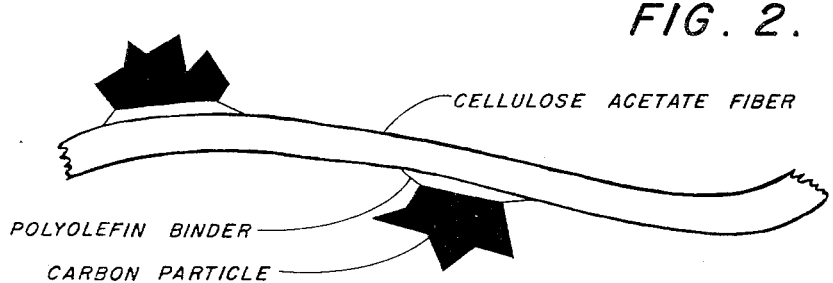

For further assistance in an understanding of the present invention reference may be made to the attached drawing forming a part of this application. FIGURE 1 is a schematic side-elevation view on a greatly enlarged scale of a plurality of tow filaments carrying the carbon particles and bonding agent of the present invention. FIGURE 2 is a sectional view on an enlarged scale, in which a segment has been depicted on a further enlarged scale, of a filter rod containing a plurality of filaments carrying the carbon additive of the present invention. FIGURE 3 is a diagrammatic illustration of a single tow filament carrying the polyolefin bonded carbon particles of the present invention.

Inasmuch as these several figures are thought readily understandable by inspection thereof, no further detailed description pertaining thereto is set forth.

A further understanding of our invention will be had from a consideration of the following examples which are set forth to illustrate certain preferred embodiments.

EXAMPLE I

Approximately eleven hundred twenty-five milligrams of 12 x 30 mesh coconut carbon granules were thoroughly mixed with 281 mg. of finely ground polypropylene in a beaker. The mixture was then shaken on to a 150-mm. length of a 5 den./fil. crimped cellulose acetate tow which had 6000 filaments and which had been spread out to a width of 15 inches. The tow was then re-compacted and wrapped with a paper tape to form a filter rod with a circumference of 25 mm. This circumference is equal to that of a standard domestic cigarette. The rod was then heated in an oven at 140° C. for 10 minutes. The rod was cooled to room temperature, cut into 10-mm. segments which contained approximately 75 mg. of carbon. The 10-mm. filter rods were attached to a king-size cigarette by means of a cellophane tape. The cigarette was then smoked with an automatic smoking device. The vapor which passed through the filter was collected and analyzed by gas chromatography. The amounts of several components of the collected gas are listed in Table 1. The amounts of the same components found in unfiltered smoke are also listed in Table 1 for comparison.

Several of the filters were opened and examined. It was observed that the carbon particles were tightly bonded to the cellulose acetate fibers. None of the particles sifted out of the filters when they were tapped on a hard surface.

TABLE 1

| Component | μg. Found in Unfiltered Smoke From One Cigarette | μg. Found in Filtered Smoke From One Cigarette |
| --- | --- | --- |
| Acetaldehyde | 800 | 240 |
| Propionaldehyde | 40 | 12 |
| Acrolein | 85 | 21 |
| Methanol | 120 | 36 |
| Methyl ethyl ketone | 75 | 22 |
| Isoprene | 600 | 180 |

EXAMPLE II

Approximately sixteen hundred fifty milligrams of 20 x 50 mesh petroleum carbon granules were thoroughly mixed with 550 mg. of powdered polyethylene in a beaker. The mixture was then dusted onto a 150-mm. length of crimped cellulose acetate filter tow (5 den./fil.=3700 fil.) which had been opened to a width of 15 inches. The tow was bundled and wrapped with a paper tape to form a filter rod by a conventional method.

The rod was heated at 113° C. for 15 minutes and then cooled to room temperature. It was cut into 10-mm. segments which contained approximately 110 mg. of carbon. The carbon did not sift out of filters made in this manner. The 10-mm. segments were attached to a king-size cigarette by means of a cellophane tape. The cigarette was then smoked with an automatic smoking device. The vapor which passed through the filter was collected and analyzed by gas chromatography. The amounts of several components of the collected gas are listed in Table 2. The amounts of the same components found on unfiltered smoke are listed for comparison.

TABLE 2

| Component | μg. Found in Unfiltered Smoke From One Cigarette | μg. Found in Filtered Smoke From One Cigarette |
| --- | --- | --- |
| Acetaldehyde | 800 | 200 |
| Propionaldehyde | 40 | 10 |
| Acrolein | 85 | 9 |
| Methanol | 120 | 40 |
| Methyl ethyl ketone | 75 | 15 |
| Isoprene | 60 | 150 |

EXAMPLE III

Approximately eight hundred ten milligrams of 30 x 60 mesh carbon granules derived from wood was mixed with 145 mg. of a finely ground copolymer of propylene and butylene which analyzed as 40 percent butylene. The mixture was spread onto a 150-mm. length of crimped cellulose acetate filter tow (1.6 den./fil.-20.000 filaments) 15-inches wide. The tow was bundled and wrapped with a paper tape to form a filter rod by a conventional method. The rod was then heated in an oven at 85° C. for 8 minutes. The rod was cooled to room temperature, cut into 10-mm. segments which contained approximately 54 mg. of carbon. The carbon did not sift from the filter made in this manner and microscopic observation revealed the filaments of cellulose acetate bonded to the carbon. The 10-mm. segments were attached to a king-size cigarette with a cellophane tape. The cigarette was then smoked with an automatic smoking device. The vapor which passed through the filter was collected and analyzed by gas chromatography. The amounts of several components of the collected gas are listed in Table 3. The amounts of the same components found in unfiltered smoke are listed for comparison.

TABLE 3

| Component | μg. Found in Unfiltered Smoke From One Cigarette | μg. Found in Filtered Smoke From One Cigarette |
| --- | --- | --- |
| Acetaldehyde | 800 | 560 |
| Propionaldehyde | 40 | 20 |
| Acrolein | 85 | 42 |
| Methanol | 120 | 72 |
| Methyl ethyl ketone | 75 | 45 |
| Isoprene | 600 | 360 |

While in the above examples we have described heating the rods to cause the heat sensitive polyolefinic component to coalesce and bond the carbon to the filaments, the bonding may be accomplished by heating the spread out tow prior to such forming. Various apparatus arrangements and methods for applying carbon additive on large scale operations comprises the subject matter of patent applications by our coworkers as illustrated by Fritz et al. Ser. No. 489,328 filed Sept. 22, 1965. The several intermediate carbon-polyolefin compositions described in detail herein may be employed in the method of our coworkers' patent applications.

Although the invention has been described in considerable detail with particular reference to certain preferred embodiments thereof, variations and modifications can be effected within the spirit and scope of the invention as described hereinabove and as defined in the appended claim.

We claim:

1. A method of producing a filter element containing activated carbon particles which comprises,
    (A) spreading open a compacted cellulose acetate filamentary tow,
    (B) adding a blend of 50 to 95% carbon particles and 5 to 50% of low melting polyolefin particles to said opened tow, (C) recompacting the tow,
(D) heating the recompacted tow at a temperature of 60 to 180° C. and sufficient to soften the polyolefin particles and cause said polyolefin to randomly bond the carbon particles to the filaments of the tow at localized points on said carbon particles and said filaments, thereby providing a filter element containing activated carbon particles.

References Cited

UNITED STATES PATENTS

| | | | |
|---|---|---|---|
| 2,805,671 | 9/1957 | Hackney et al. | 131—208 |
| 3,313,306 | 4/1967 | Berger et al. | 131—266 |
| 2,765,515 | 10/1956 | Knudson | 131—266 |
| 2,881,770 | 4/1959 | Touey | 131—266 |
| 3,217,715 | 11/1965 | Berger et al. | 131—267 |

FOREIGN PATENTS 205,940  2/1957  Australia.

ROBERT F. WHITE, *Primary Examiner.*

M. D. REIN, *Examiner.*

J. R. HALL, *Assistant Examiner.*